United States Patent [19]

Metz

[11] Patent Number: 4,735,675

[45] Date of Patent: Apr. 5, 1988

[54] HEATING DEVICE FOR SEALING MATERIAL TO EFFECT DIFFERENT BOND STRENGTHS

[75] Inventor: Bruce E. Metz, Wilmington, Del.

[73] Assignee: Athena Controls Inc., Plymouth Meeting, Pa.

[21] Appl. No.: 371,543

[22] Filed: Apr. 26, 1982

[51] Int. Cl.$^4$ .............................................. B30B 15/34
[52] U.S. Cl. ................................. 156/583.4; 53/450; 53/451; 493/197; 493/202; 493/203
[58] Field of Search ................. 156/583.4, 251, 583.1, 156/583.7, 583.9; 53/450, 451; 493/194, 197, 199, 202–203, 205, 207–209, 230; 206/632; 383/37, 94

[56] References Cited

U.S. PATENT DOCUMENTS

| | | | |
|---|---|---|---|
| 2,257,823 | 10/1941 | Stokes | 383/37 |
| 2,385,897 | 10/1945 | Waters | 383/37 |
| 2,430,995 | 11/1947 | Roos | 53/450 |
| 2,442,936 | 6/1948 | Rohdin | 493/194 |
| 2,648,463 | 8/1953 | Scherer | 156/292 |
| 2,743,761 | 5/1956 | Snyder et al. | 493/209 |
| 2,835,433 | 5/1958 | Swartz et al. | 383/94 |
| 3,314,591 | 4/1967 | Cheeley | 383/94 |
| 3,579,397 | 5/1971 | Schwarzkopf | 156/251 |
| 3,679,871 | 7/1972 | Evalds | 219/499 |
| 4,288,965 | 9/1981 | James | 53/451 |

*Primary Examiner*—Donald E. Czaja
*Assistant Examiner*—Merrell C. Cashion, Jr.
*Attorney, Agent, or Firm*—William E. Cleaver

[57] ABSTRACT

The present invention is used to heat seal seams, and the like, of item holding means such as plastic bags holding loose fill product like beans, hard candy, pretzels, potato chips, etc. The heating station of the present invention has at least two independently controlled heating positions in each half of a pair of jaws and each heating position is heat insulated from the other and each respectively can provide different amounts of heat to material coming in contact therewith. Accordingly, the bonded areas of item holding means can be manipulated to control local package characteristics, i.e., sealed to have a stronger bond strength at one location that at another location, adjust tear properties to suit marketing methods (such as hole punched top seals) and to control seal integrity.

2 Claims, 1 Drawing Sheet

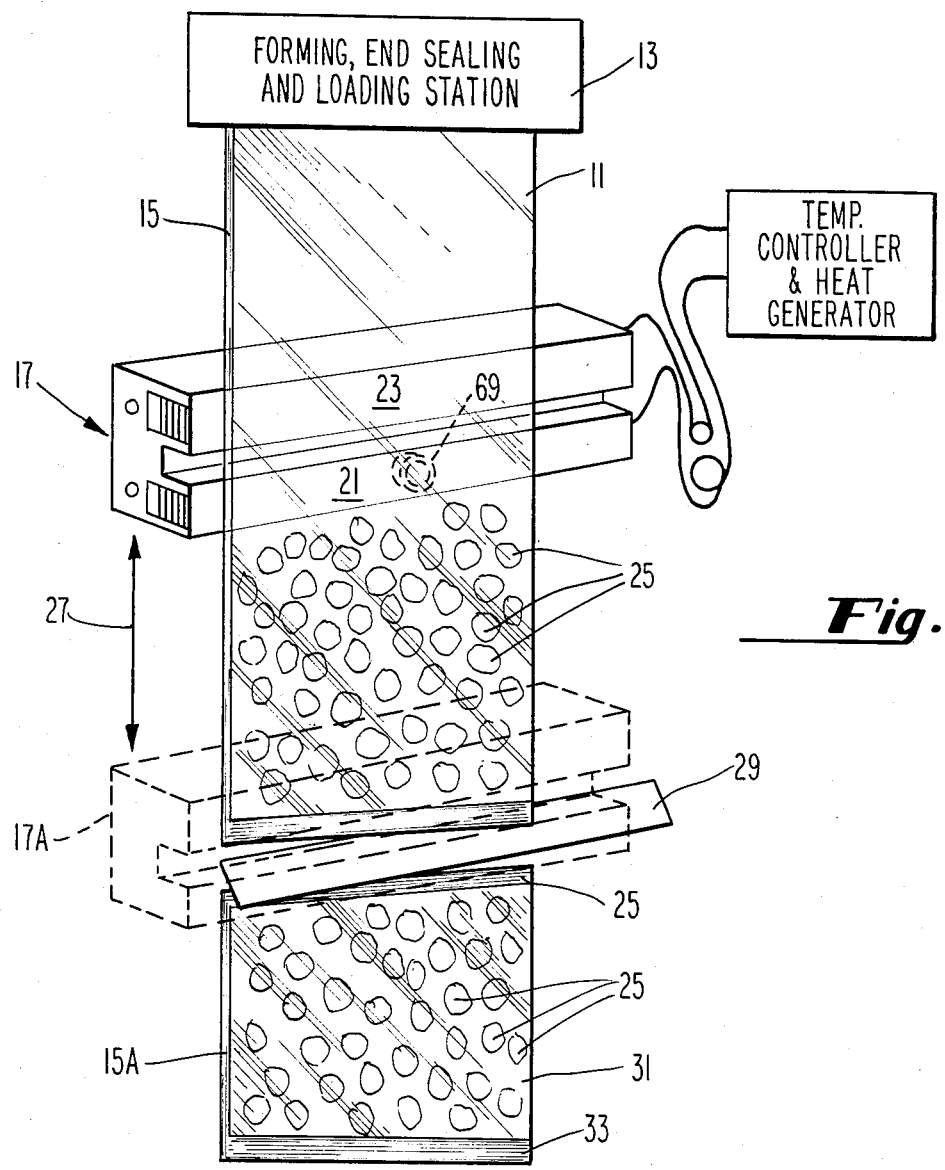
Fig. 1
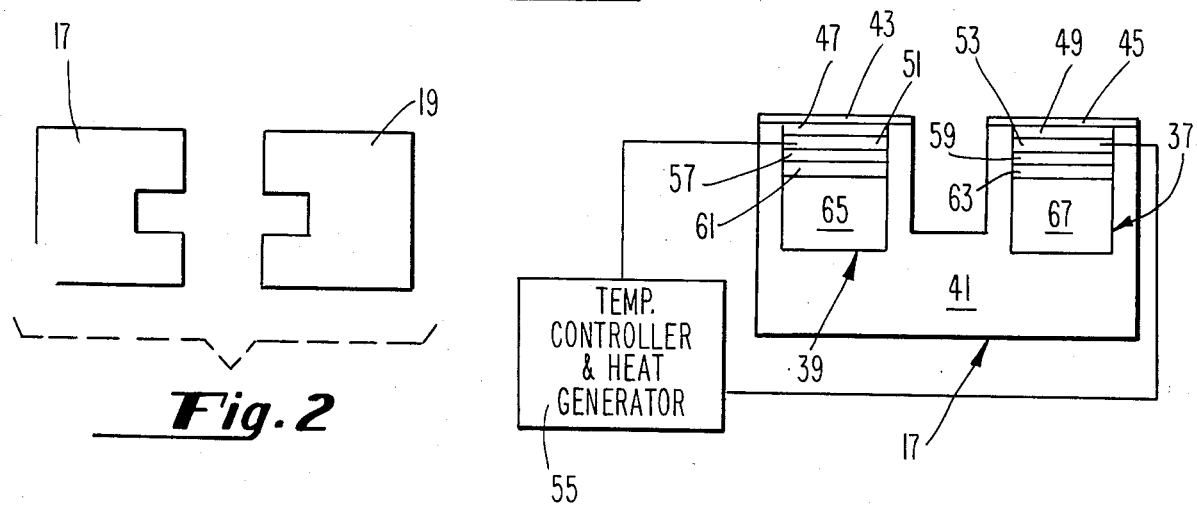
Fig. 2
Fig. 3 ically sealed package. This is true because the seal is as effective as the plastic material itself and there is no way to get the seal to come apart without some effort. Some manufacturers have tried to solve the problem of opening a well sealed package by providing "cut-outs" in the side seal so that the package can be torn at the cut-out. It has been found that even with the cut-out being provided, nonetheless the package or bag is difficult to open. This is true because the plastic material, even with the cut-out provided, simply is as strong as the seal and hence just as difficult to tear.

HEATING DEVICE FOR SEALING MATERIAL TO EFFECT DIFFERENT BOND STRENGTHS

BACKGROUND

In the prior art processes of packaging items, such as potato chips, hardware bolts, etc. in flexible packages, the plastic material has been frequently passed through a web forming system. Plastic material is drawn from a large roll and formed into a substantially tubular configuration. The side ends of the material, as they assume the tubular configuration, are heat-sealed to one another to form a back seal for the plastic bag. During the same operation, at some given location, the cross section of the tubular configuration of plastic is sealed to form the bottom of the bag. After the items are loaded into the bottom sealed and back-sealed plastic material (in its tubular configuration), the plastic material is sealed at a second cross-section location to effect the top closure of the sealed package. Heretofore, the top of a preceding bag (in a train of bags being loaded) was sealed at virtually the same time as the bottom of a subsequent bag (in the train of bags being loaded) and a knife device cut the plastic between the sealed top and sealed bottom of the two bags. Heretofore, in sealing the top of a loaded bag while sealing the bottom of a subsequently loaded bag, there was no difference effected in the bond strengths of the top and bottom location. Accordingly, users have had difficulty in opening a plastic bag of, for instance, potato chips and the like. This problem has been dealt with to some extent by providing a "cut-out" at the top seal. The user has been invited to "tear" the top seal at the "cut-out". The problem which has arisen in the "tear" arrangement is that if the top seal is as good a seal as the bottom seal, then attempts to tear the "cut-out" simply do not enable the user to open the package. It has been found that to effect a good "tear" condition, the plastic should be heated at a different temperature than it was heated to effect a seal. The present invention provides a heating station which enables the bottom seal of each bag to be sealed at a higher temperature than the top seal of each bag and thus, the user can readily open the package.

SUMMARY

The present invention, in a preferred embodiment, provides a supporting structure in which there are located two stacks of layered materials. The stacks of layered materials are separated one from the other by an air gap which provides thermal isolation. The stacks of layered materials include an outer thin layer of stainless steel which comes in contact with the plastic material to effect a seal. In abutment, with the stainless steel outer layer, is a first layer of copper which acts as a heat sink to conduct heat from a heating element (which heating element is the next layer in the stack) to the outer layer and hence, to warm the plastic material for sealing. On the other side of the heating element, is a second layer of copper which also acts as the heat sink. Next to the second heat sink is a heat insulation layer of silicone rubber. Rubber is used to give resiliency to the entire assembly. Supporting the silicone rubber layer is a block of G-7 Lamitex which offers structural support and is also a heat insulator. The heating element is part of a heat generating and control system which uses the heating element also as a sensor device as described in U.S. Pat. No. 3,679,871 assigned to the assignee of this application.

The objects and features of the present invention will be better understood in view of the following description taken in conjunction with the figures in which:

FIG. 1 is a pictorial schematic showing one-half of a pair of jaw and its relationship with the material to be sealed and cut into bags;

FIG. 2 shows the relationship between a pair of jaws at the sealing station; and FIG. 3 is an end-view schematic showing the relationship between stacked layers and includes a temperature controller.

Consider FIG. 1., there is shown a sheet of plastic material 11 which has been drawn from a roll of plastic material (not shown) through a forming station 13. At the forming station 13, the sheet of plastic material is drawn over a collar-type device and is formed into a tubular configuration. When the plastic material is formed into a tubular configuration, its side ends are sealed together to form a back seam such as that shown in phantom by the sealed end 15. The plastic material in the tubular form is drawn through the station 13 by having the jaws 17 grasp or clamp the plastic material and draw the plastic material down to the position shown by the jaws in phantom and identified as 17a. It should be borne in mind that there is a pair of jaws such as shown in FIG. 2 and identified as 17 and 19. While the jaws shown in FIG. 2 are mirror images of one another, it should be borne in mind that only one half of the jaw device, that is either 17 or 19, need be the device that provides the heat and the other side could simply be flat bar. In the preferred embodiment, both halves of the jaws 17 and 19 provide heat, which provides a better seal. Also in a preferred embodiment the jaws have serrated faces to readily effect grasping the packaging material.

When the jaws 17 and 19 come together at the location shown by the jaws 17 in FIG. 1., there is a seal effected at position 21 and a second seal effected at position 23. The seal effected at position 21 is the top seal of a lower bag in a train of bags. It will be noted in FIG. 1. that the lower bag 31 is filled with material depicted by the small circular configurations 25.

The jaws 17 and 19 come together in the position jaw 17 as shown in FIG. 1., and not only seal the lower bag at position 21, but seal the bottom of the upper bag at position 23. After the sealing effort has taken place or more accurately, simultaneously therewith, the jaws move as indicated by the arrow 27 in a downward direction to the position shown by the phantom jaws 17a. When the jaws are in position of the phantom jaws 17a, there is a knife device 29 which cuts the lower bag 31 from the upper bag. Note that the lower bag 31 is sealed at the bottom by seal 33 and is sealed at the top by the seal 35 while it is sealed vertically by the seal 15a. Accordingly, the bottom bag 31 is completely ready to go to the marketplace. In another configuration the gap could be eliminated and a third heating station could be located at the gap position to heat the packaging material to a "tear" heat whereby the packages could be torn apart rather than cut apart by a knife.

It is one of the main purposes of the present invention to provide that the seal 33 is different from the seal 35 with respect to bond strength. It is well understood by the consumers of potato chips, pretzels, snacks and even hardware items that when a package has been sealed with a good seal, it is difficult to open the end of that package. Such difficulty is particularly aggravating to a hungry customer. The present invention provides that the seal which takes places in position 21, that being the upper end bag, is characterized by having less bond strength than the seal which is effected at position 23. This is accomplished by providing less controlled heat to the sealing mechanism at position 21 than is applied at position 23. The mechanism which makes this possible is depicted to great extent in FIG. 3.

In FIG. 3 we find an end view of the left hand jaw 17 of the jaw pair. In the preferred embodiment, the jaw 17 is fabricated by cutting two slots 37 and 39 from a steel supporting means 41. Note that the steel supporting means 41 has two protruding sections into which the slots 37 and 39 are cut. The protruding section would not be necessary if the knife is not used for cutting. At the top of the protruding sections, there are secured two thin strips of stainless steel identified as 43 and 45.

In the illustrated embodiment, the stainless steel is a stainless steel strip having a thickness of 0.005 inches. The purpose of the stainless steel facing 43 and 45 is to provide the means that will come in contact with the plastic material and which will accept all of the physical abuse as far as the faces of the jaws are concerned. Under the stainless steel facing 43, there is shown a copper layer 47 while under the stainless steel facing 45, there is shown a copper layer 49. The copper layers 47 and 49 act as heat sinks to distribute the heat from the heating elements 51 and 53 to the stainless steel facings 43 and 45.

The heating elements 51 and 53, in the preferred embodiment, are Symplaner heat elements manufactured by Athena Controls, Inc. the assignee of this patent application. The Symplanar heating element is a meandering path of resistive alloy sandwiched between two layers of Kapton (trademark of DuPont Co.). Other forms of heating elements could be used. The heating elements 51 and 53 are connected to a temperature controller and power supply 55. The temperature controller and power supply 55, in the preferred embodiment, is an Athena 68 temperature controller device manufactured by Athena Controls, Inc., Conshohocken, Pa. The temperature controller and power supply 55 provide electrical energy to the heating elements 51 and 53 to cause heat to be generated thereat. The circuitry of the temperature controller and power supply 55 is such that the heating elements 51 and 53 also act as the heat sensor devices so that the control and/or monitoring of the heat being provided to those heating element positions, is very accurate.

Positioned in abutment with the heating element 51 is copper layer 57 and positioned in abutment with the heating element 53 is a layer of copper 59. The copper layers 57 and 59 also act as heat sinks to distribute the heat along the back of the heating elements which also adds to the heat being carried to the stainless steel facings 43 and 45, to be used in the sealing action.

In the prederred embodiment, the copper heat sinks 47, 49, 57 and 59 are layers of copper having a thickness of 0.040 inches.

Positioned in abutment with the copper heat sink 57 is a layer of silicone rubber 51 while positioned in abutment with the heat sink 59 is a layer of silicone rubber 63. The silicone rubber layers 61 and 63, in the preferred embodiment, are 1/32 of an inch thick. The silicone rubber layers 61 and 63 act as heat insulators to keep the heat being generated by the elements 51 and 53 from being absorbed by the mass of steel 41. Finally, positioned in support of the stacked layers 43, 47, 51, 57 and 61 is a block of G-7 Lamitex 65 while in the right hand slot 37 there is a block of G-7 Lamitex 67 in the same role. The Lamitex blocks 65 and 67 are also heat insulators as were the silicone rubber layers 61 and 63. The purpose of the rubber layers 61 and 63 is not only to provide heat insulation, but to provide resiliency for the entire stacked package. In other words, when the jaws are squeezed together, and in fact, there is something therebetween, namely the packaging material, there is certain amount of pressure on the steel tapes 43 and 45 and the resiliency provided by the rubber layers 61 and 63 permits those layers to absorb that pressure energy and thereby, prevent or mitigate any damage which might be done to the layered materials.

The fact that the heating structure comprised of the stacked layers in the grooves 37 and 39 represents a low mass form of heating structure, enables the temperature control to be very effective. In other words, the mass can be heated up quickly and its temperature can be manipulated locally in particular locations to intentionally change specific seal properties. For instance, if the heating element is arranged in a folded arrangement, such as described in my copending patent application, Ser. No. 06/294,336, to provide more heat at a given location for whatever reason, the present heating arrangement with the stacked layers makes such an isolated, or particular, location readily heatable to a higher degree than some other location. The manipulation of temperatures with respect to the plastic material can be used in ways other than providing two dissimilar seals such as described above.

For instance, if a plastic material strip is heated to a relatively high degree, then such plastic material strip can become a "tear" form of strip which can be useful in some forms of packaging. For instance, as mentioned above, a tear strip could coold be used to separate the packages or to enable a user to open a package. In addition, if the jaws were to be fabricated with an elongated doughnut form of protrusion, such as the protrusion in phantom and identified as 69 and located at the position 21 of the jaws 17 in FIG. 1., then such a protrusion could be heated up with a higher degree of heat than the surrounding areas of the jaw face to provide a burned out or melted out hole through the top seal such as seal 35. Such a hole would be available to hang the bag of material on some form of rack. The melted out hole is preferrable to a cut out hole because a cut out hole provides a "tear" characteristic, very often.

I have found in one operation that if the bottom seal such as seal 33 in FIG. 1. of the bag is sealed at 250 degrees (Fahrenheit) and the top seal of the bag such as seal 35, is sealed at 235 degrees (Fahrenheit), that the bottom seal is a very firm seal and there is great difficulty in opening it while the top seal 35, is a firm seal but can be opened with a reasonable effort to pull the seal apart. Obviously, other temperatures could be used to effect the kinds of seals that the user wants to use and in all cases would depend on the packaging material used.

While I have described my invention with a preferred embodiment of stacked layers, such as shown in FIG. 3., it should be understood stood that the heat transfer means (in each half of a jaw half) could comprise simply a heating element (Symplanar) secured to a heat insulator (mounted on a jaw device) wherein the heating element would serve as the face of the jaw and the heat insulator would serve as the back up support means. Such as arrangement used with an Athena 68 controller or its equivalent would be within the spirit and claims of this invention.

The present invention provides a means for accurately and rapidly controlling the temperature at a heating station in a packaging device, such as the one described herein. Since temperature plays a major role in the characteristics of a seal, such as the bond strength of the seal, then it follows, the present invention is very useful in effecting different seal characteristics for packages to be sealed and different seal characteristics at different locations of the same package.

I claim:

1. A heat sealing arrangement to be used with a container fabricating machine which fabricating machine: fabricates containers in a trainlike fashion with a preceding container being followed by a subsequent container; fabricates containers having first and second ends; fabricates containers made of heat sealable material comprising in combination: first and second heating elements each having first and second sides; first and second heat transfer means formed to transfer heat to said sealable material, each of said first and second heat transfer means having a layer of rigid material having first and second sides with said repective first sides disposed to come in contact with said sealable material; first and second layers of heat sink material each having first and second sides said first and second layers of heat sink material disposed so that there respective first sides are in abutment with the second sides respectively of said first and second layers of rigid material and further disposed so that their respective second sides are in abutment with said first sides respectively of said first and second heating elements; third and fourth layers of heat sink material each having first and second sides and said third and fourth layers of heat sink material disposed so that their respective first sides are in abutment with the second sides respectively of said first and second heating elements; and first and second layers of heat insulating material each having first and second sides and disposed to have their respective first sides respectively in abutment with the second sides respectively of said third and fourth layers of heat sink material.

2. A heating device according to claim 1 wherein said layer of heat insulating means is formed to have a resilient characteristic.

* * * * *